(12) United States Patent
Heyraud et al.

(10) Patent No.: US 6,695,562 B2
(45) Date of Patent: Feb. 24, 2004

(54) DEVICE AND PROCESS FOR THE TRANSFER OF OBJECTS BETWEEN TWO OPEN RECEPTACLES

(75) Inventors: Jacques Heyraud, Venelles (FR); Denis Gremeaux, Venelles (FR); Daniel Brulard, Villeneuve lez Avignon (FR); Jean-Jacques Margueron, Manosque (FR); Serge Chabrol, Pierrevert (FR)

(73) Assignee: Compagnie Generale des Matieres Nucleaires, Velizy-Villacoublay (FR)

( * ) Notice: Subject to any disclaimer, the term of this patent is extended or adjusted under 35 U.S.C. 154(b) by 68 days.

(21) Appl. No.: 10/047,067

(22) Filed: Jan. 15, 2002

(65) Prior Publication Data
US 2002/0098068 A1 Jul. 25, 2002

(30) Foreign Application Priority Data
Jan. 17, 2001 (FR) .............................. 01 00593

(51) Int. Cl.$^7$ .............................. B65G 65/23
(52) U.S. Cl. .............................. 414/405
(58) Field of Search .............................. 414/405, 773; 366/213

(56) References Cited

U.S. PATENT DOCUMENTS 2,253,271 A * 8/1941 Hamilton .............. 366/213
4,642,016 A   2/1987 Bucher et al.

FOREIGN PATENT DOCUMENTS

| DE | 3338498 | * 5/1985 | ............ 414/405 |
| EP | 0 300 246 | 1/1989 | |
| FR | 2.095.377 | 6/1971 | |
| JP | 1075756 | * 3/1998 | |
| WO | 93/13915 | 7/1993 | |

* cited by examiner

Primary Examiner—Steven A. Bratlie
(74) Attorney, Agent, or Firm—Pearne & Gordon LLP

(57) ABSTRACT

Two receptacles open at the top (15, 16), one of which contains objects (17) are put onto a rotating tray (3) under a convex cover (5). They are held in place by an appropriate device (11, 12). The tray and the cover are rotated by one complete turn such that the objects (17) come out of the first receptacle (15), roll under the cover (5) and finally drop into the other receptacle (16).

13 Claims, 6 Drawing Sheets

DEVICE AND PROCESS FOR THE TRANSFER OF OBJECTS BETWEEN TWO OPEN RECEPTACLES

BACKGROUND OF THE INVENTION

The subject of this invention is a device and the corresponding process for transferring objects between open receptacles.

It may be necessary to transfer objects to accomplish some operations. The applicant thus considered baking nuclear fuel pellets to sinter their material. A large number of these pellets are placed in trays with rims open towards the top circulating on a manufacturing line. These trays are normally made of steel, but a transfer is necessary for baking because this metal would not resist the treatment temperatures. This is why similar receptacles will replace them temporarily, made of a more refractory material such as molybdenum. A manual transfer would not be very efficient, and would have to be done painstakingly and would require careful precautions to prevent damage to the objects which may be fragile or friable. And in any case it would be impossible in this application in which the pellets are radioactive.

A convenient, simple transfer device that does not necessitate a large drop height for the pellets is required for this case. This is the subject of this invention, but it can also be applied to other domains.

SUMMARY OF THE INVENTION

The device according to the invention comprises a rotating tray, a convex cover on at least one side of the tray and, with the tray, forming two slits facing each other, tracks each terminating in one of the slits, means of moving the receptacles between the tracks and the tray, and means of retaining the receptacles on the tray in the turning and turned positions.

BRIEF DESCRIPTION OF THE SEVERAL VIEWS OF THE DRAWING

Other aspects of the invention will become clear after reading the following detailed description with relation to the following figures.

DETAILED DESCRIPTION OF THE INVENTION

Figure 1:
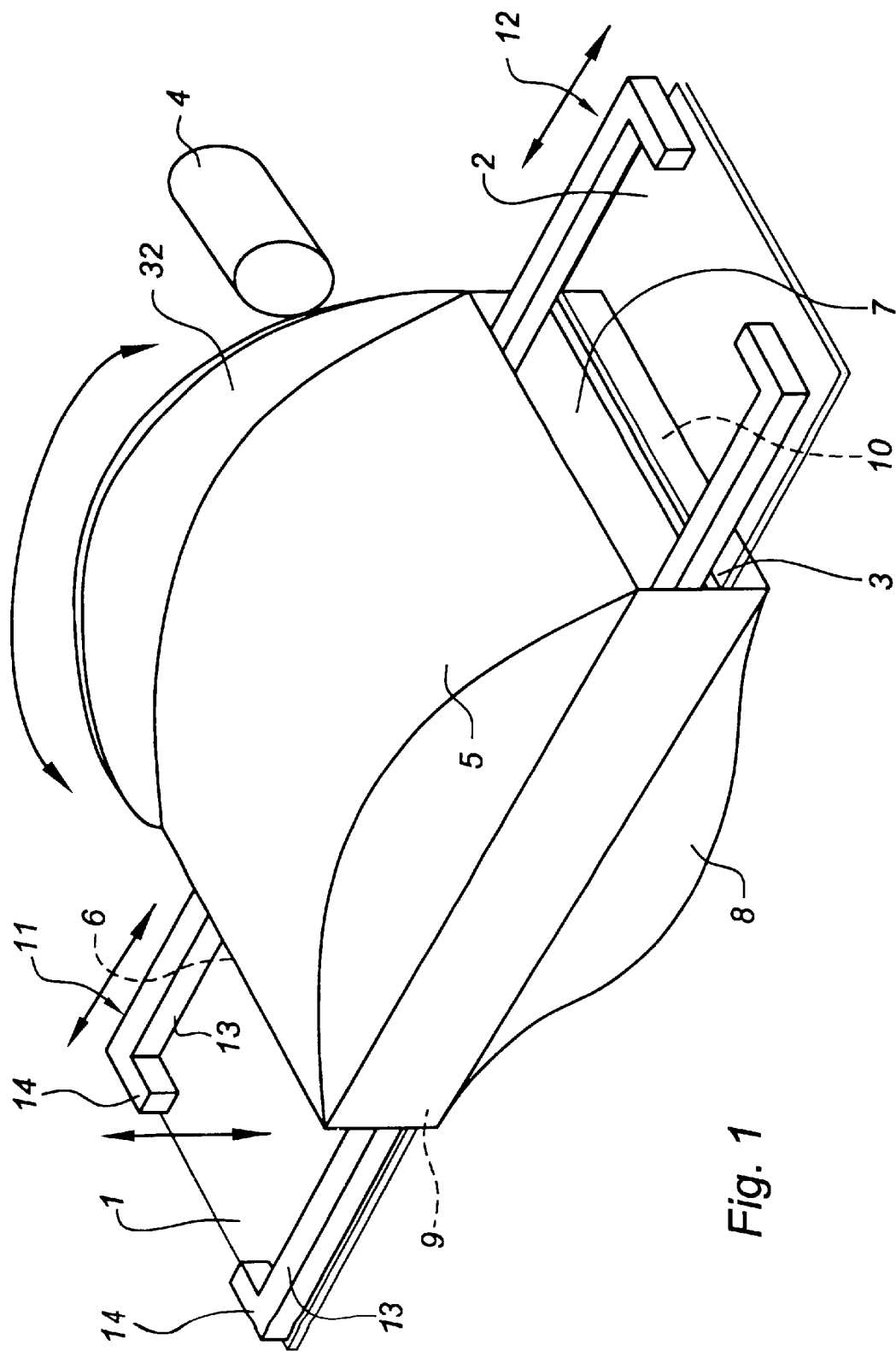
FIG. 1 is a general view of an embodiment of the invention.
Figure 2:
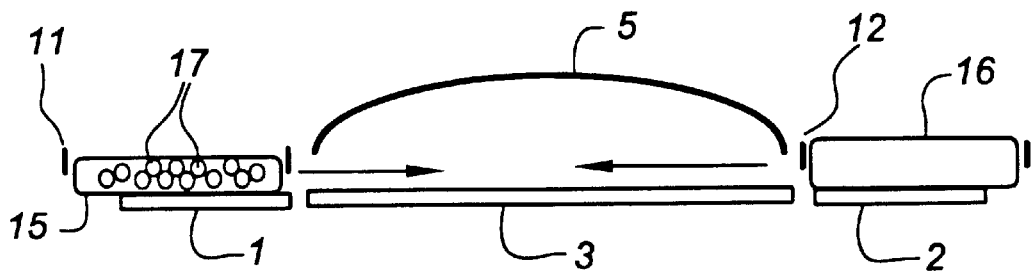
FIGS. 2 to 8 illustrate the steps in a transfer process.
Figure 3:
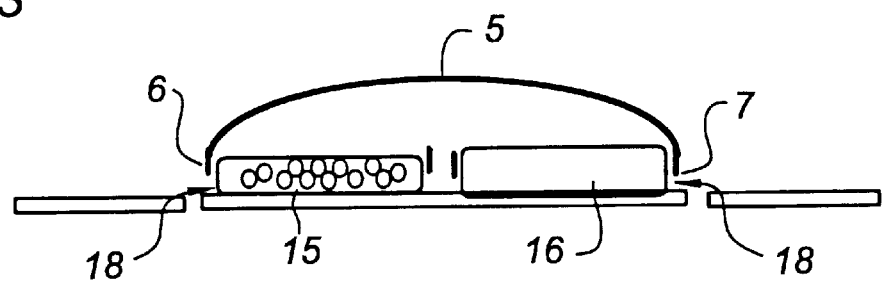

According to FIG. 1, the transfer device is placed between two tracks 1 and 2 that may be of different natures: portion of conveyor, elevator tray, etc., depending on the technique in which the invention is applied. The device comprises mainly a tray 3 rotating about a horizontal axis driven by motor 4 rotating a disk 32 on the side of the tray 3 through a gear. A convex cover 5 extends over its upper face and the convex cover and the tray 3 delimit two slits 6 and 7 facing each other, these slits 6 and 7 opening onto tracks 1 and 2. Note that a lower cover 8 extends under the lower face of the tray 3, with the same formation of slits 9 and 10 extending under tracks 1 and 2; the reasons for this layout will be described later. Furthermore, depending on the device, two forks 11 and 12 may exit through slits 6 and 7 and slide above tracks 1 and 2; each of the forks 11 and 12 comprises a pair of sliding arms 13 parallel to the longitudinal edges of the tray 3, and two pins 14 extending one towards the other at the end of the arms 13 and, in a manner of speaking, enclose the space surrounded by them. Similar forks not shown are also provided with slits 9 and 10 located under the tray 3.

Refer to the following FIGS. 2, 3, 4, 5, 6, 7 and 8 for an explanation of the operation of the invention. Two receptacles 15 and 16 are placed on the tracks 1 and 2 at the beginning of the process (FIG. 2), one of which is filled with nuclear fuel pellets 17 and the other is empty. The forks 11 and 12 were extended beforehand, and tracks 1 and 2 lifted so as to put the receptacles 15 and 16 into the turning position between their arms 13.

The next step (FIG. 3) consists of retracting the forks 11 and 12 such that the receptacles 15 and 16 exit the tracks 1 and 2 and enter under the convex cover 5 resting on the tray 3 The slits 6 and 7 are then closed, the forks 11 and 12 being designed to put the rear edges 18 of the receptacles 15 and 16 across the slits to close them.

Figure 4:
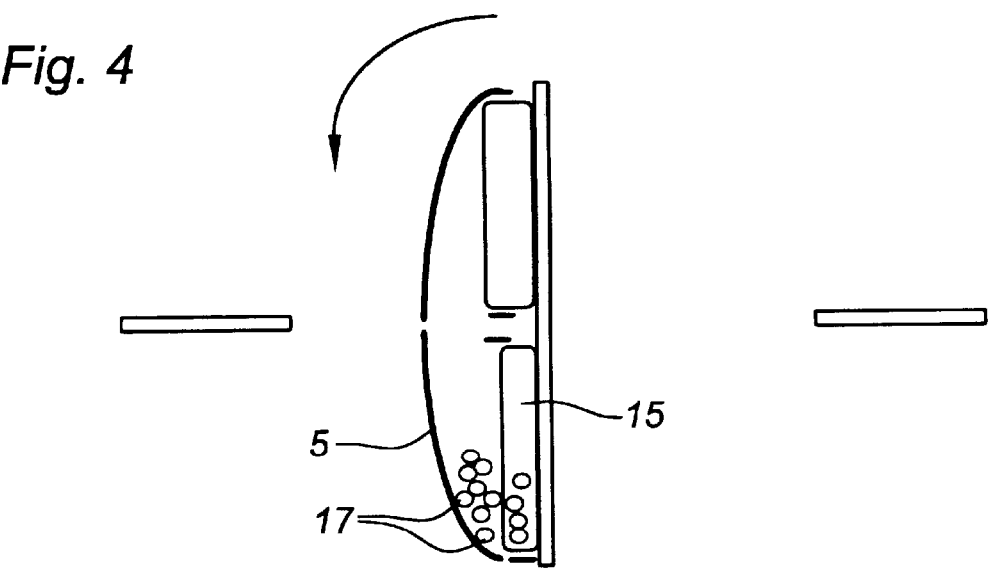
Figure 5:
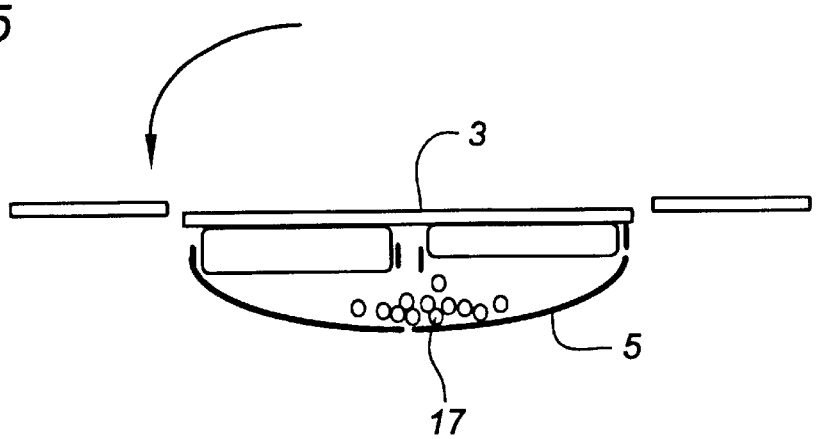
Figure 6:
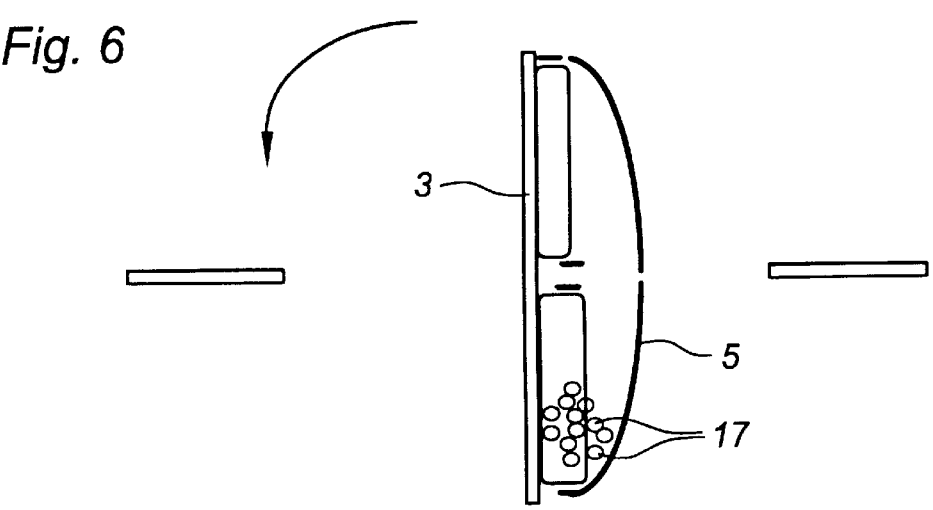
Figure 7:
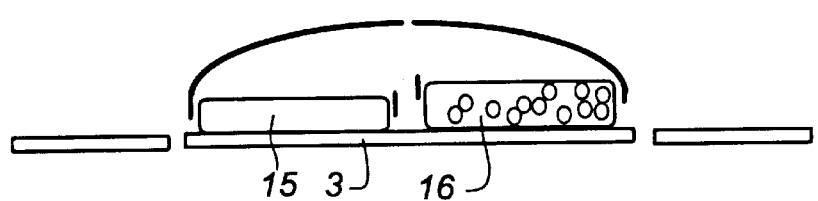
Figure 8:
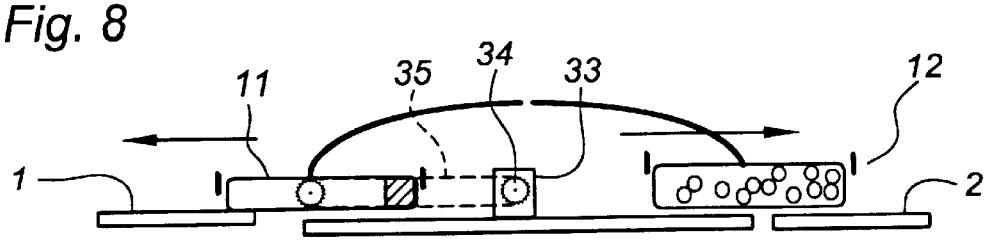

The tray 3 and its contents are then rotated once. As the tray 3 is rotated, the first receptacle 15 moves to the bottom and the pellets 17 come off the tray and roll onto the concave face of the convex tray 5 (FIG. 4). Next the tray 3 is upside down and the pellets 17 continue to roll on the concave face of the cover 5 (FIG. 5). Next, the tray 3 is then upright, the second receptacle 16 is at the bottom and the pellets 17 finish their rolling movement by reaching the end of the cover 5 (FIG. 6). Finally, as the tray 3 becomes horizontal again, they the pellets 17 are tipped into the second receptacle 16 (FIG. 7). Receptacles 15 and 16 are then in front of tracks 1 and 2 and opposite movements of forks 11 and 12 take them out of the device and put them back onto these tracks, the contents consisting of the pellets 17 having changed receptacle receptacles.

Figure 9:
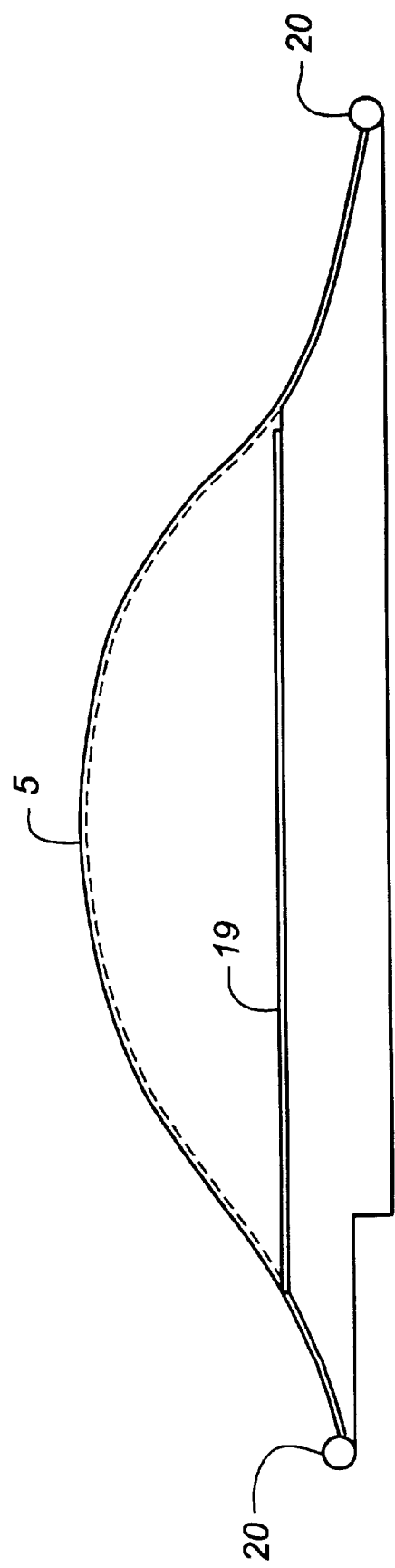
FIG. 9 illustrates a convex cover in more detail.

FIG. 9 shows that the convex cover 5 may comprise internal ribs 19 to support the sides of receptacles 15 and 16, to prevent them from dropping when the tray 3 is turned over. It is also fitted with rims 20 above the slits 6 and 7 to prevent the pellets 17 from getting trapped at this location. Other precautions may be taken; thus, an additional movement may be applied to the tray 3 after the complete turn in order to facilitate the distribution of pellets 17 in the second receptacle 16 before the tray 3 is put back into the horizontal state by an inverse movement. The disk 32 is provided with the necessary position or displacement sensors. The forks 11 and 12 may be moved by an endless chain mechanism, or a rack and pinion, etc., in which a motor 33 fixed on the tray 3 (FIG. 8) turns a gear 34 that applies a linear movement to the mechanism 35 fixed to the fork 11 or 12.

Figure 10:
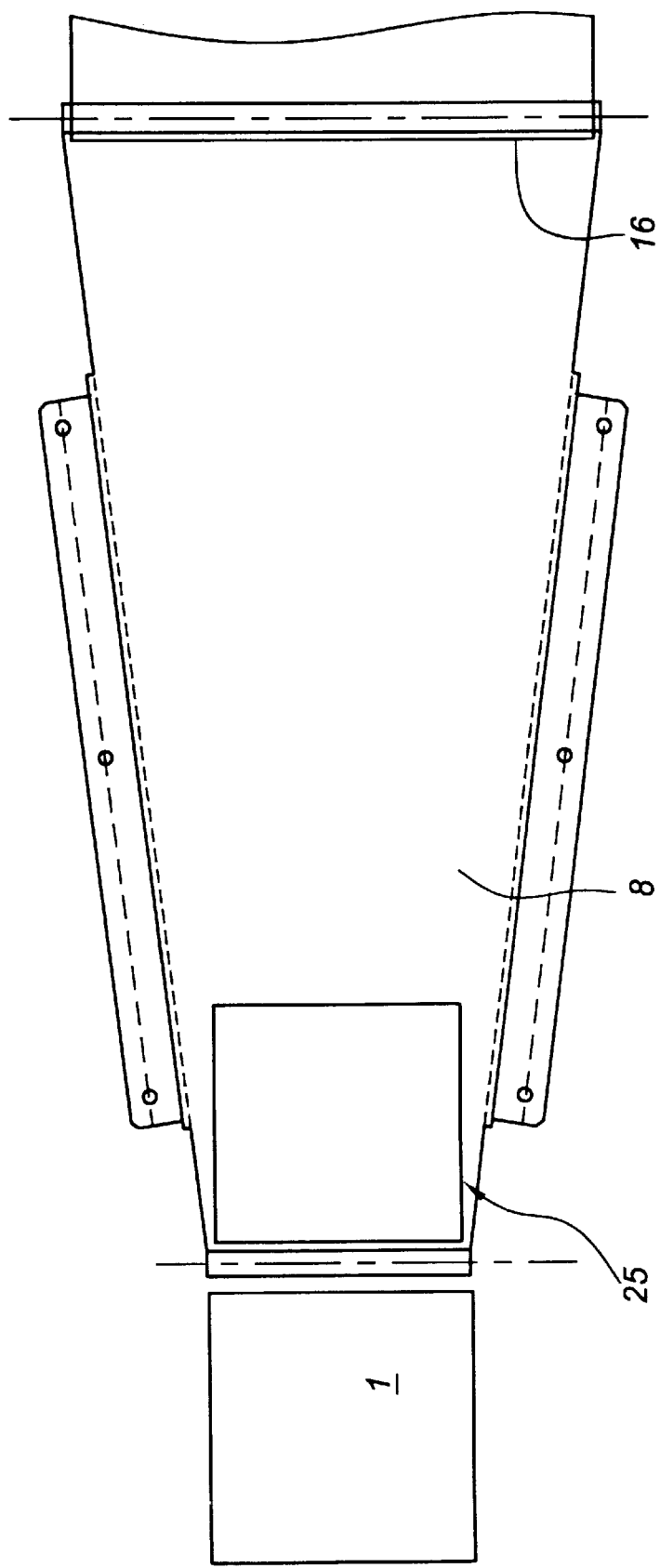
FIG. 10 illustrates a variant of the invention.

The other cover 8 may be used when the objects to be transferred perform a forward and return movement, particularly in the application envisaged by the applicant in which pellets 17 contained in a refractory receptacle 16 are baked in a furnace adjacent to the track 2 before being returned onto track 1 to continue the manufacturing process. Furthermore, this baking operation is accompanied with shrinking of pellets 17 and therefore the transported volume. This is why the shape of the lower cover 8 may be different from the shape of the first cover, and may be trapezoidal instead of rectangular when seen from the top and may become smaller from track 2 to track 1 (FIG. 10).

The forward and return transfer process envisaged with the appliance with two covers 5 and 8 begins in the same way as was explained with respect to FIGS. 2 to 8, and the tray 3 is then half turned such that the cover 8 is on top, and the process in FIGS. 2 to 8 is repeated after the second receptacle 16 has been replaced and a third receptacle 25 has been put onto tray 3; the third receptacle 25 originates from track 1 and occupies the space formerly occupied by the first receptacle 15. A complete turn is then applied to the tray 3 and the cover 8 so that the baked pellets 17 roll along the concave edge of the cover 8 and go into the third receptacle 25 that is narrower (or generally smaller) than the first receptacle 15 so that it is completely filled in with them. Obviously, since the return movement of the pellets 17 takes place in the direction opposite to that shown in FIGS. 2 to 8, the direction of rotation is also inverted. An opposite movement of the forks, not shown, associated with cover 8 removes the receptacles 16 and 25 from the device and takes them elsewhere.

In some variants of the transfer process, some receptacles may be replaced by groups of smaller receptacles so that the transferred load can be reassembled or redistributed. These smaller receptacles will be put adjacent to each other along the direction of the width of the equipment and will be moved by forks 11 and 12 simultaneously. The widths of covers 5 and 8 will also be chosen as a function of the receptacles or groups of receptacles that will be put into them.

Figure 11:
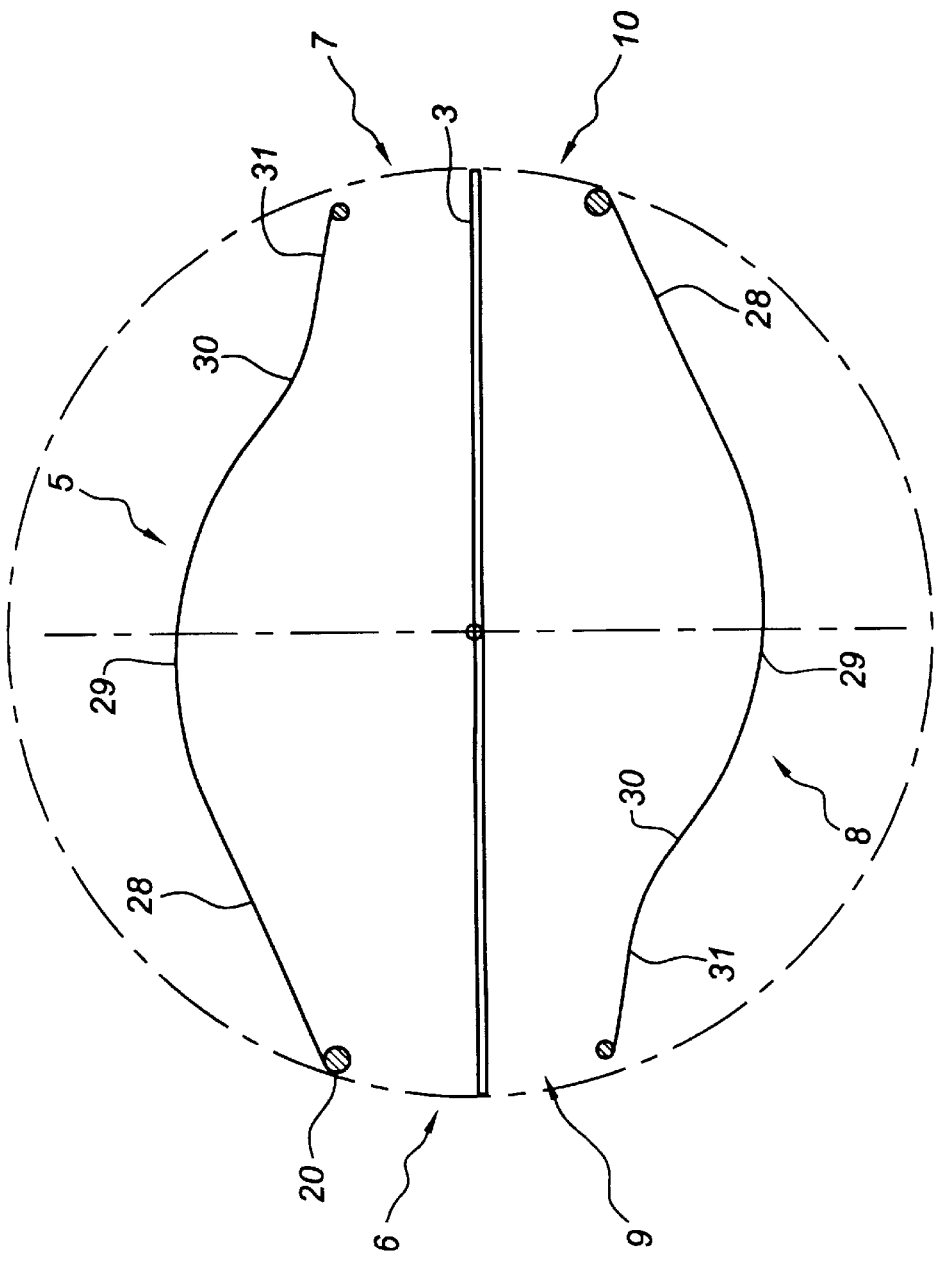
FIG. 11 represents a shape of the cover.

FIG. 11 shows the details of a profile of the turning mechanism; the convex covers 5 and 8 are similar and are placed symmetrically about a point (the projection of the axis of rotation of tray 3) and comprise a straight portion 28 inclined at 23.75°, a rounded portion 29 corresponding to the central curvature of the covers 5 and 8, a rounded point of inflection 30 of the curvature and a second straight portion, shorter and with a smaller slope than the previous portion (11°), starting from the entry slit 6 or 9 and working towards the exit slit 7 or 10. There is no sudden change in the inclination of the profile, forming no sharp corners. The entry slit has a height of 67.5 mm, and the height of the exit slit is 57.5 mm.

What is claimed is:

1. Device for transferring objects (17) between two flat receptacles (15, 16) open at the top, comprising a tray rotating about a horizontal axis, a convex cover (5) on at least one face of the tray (3) forming two slits (6, 7) between the tray and the cover, tracks (1, 2) each terminating at one of the slits (6, 7), means for displacing receptacles between the tracks and the tray, and means for holding the receptacles in place on the tray as the tray rotates.

2. Device for transferring objects according to claim 1, characterized in that the displacement means are sliding forks (11, 12) dependent on the tray.

3. Device for transferring objects according to claim 1, characterized in that the tracks are free to move vertically with respect to the tray.

4. Device for transferring objects according to claim 1, characterized in that the displacement means are adapted to place rear edges of the receptacles within the slits when the receptacles are on the tray.

5. Device for transferring objects according to claim 1, comprising convex covers (5, 8) on two opposite faces of the tray, characterized in that the covers are adapted to contain different receptacles (15, 25) close to one of the tracks (1).

6. Device for transferring objects according to claim 1, characterized in that the convex cover comprises two straight end parts (28, 31) and an intermediate convex portion (29), and the convex cover has no sharp corners between the slits (6, 7).

7. Process for transferring objects using a device for transferring objects (17) between two flat receptacles (15, 16) open at the top, comprising a tray rotating about a horizontal axis, a convex cover (5) on at least one face of the tray (3), forming two opposite slits (6, 7), tracks (1, 2) each terminating in one of the slits (6, 7) between the tray and the cover, means of displacing the receptacles between the tracks and the tray and means of holding the receptacles in place on the tray as the tray rotates, comprising the steps of:

placing a first receptacle (15) containing objects (17) on a first track (1) and a second receptacle (16) on the other track (2), bringing the said receptacles under the convex cover (5), and turning the tray (3) one full turn before taking the said receptacles out of the tray.

8. Process for transferring objects according to claim 7, the device comprising convex covers (5, 8) on two opposite faces of the tray, and in which the covers are adapted to contain different receptacles (15, 25) close to one of the tracks (1), characterized in that it also consists of removing the first receptacle, placing a third receptacle (25) on the said first (1) track, turning the tray by half a turn, bringing the said second and third receptacles under the other convex cover (8) and turning the tray by a second turn in the direction opposite to the first turn before taking the said receptacles out.

9. Process for transferring objects according to claim 8, characterized in that the other track (2) is adjacent to a furnace for baking objects, mainly nuclear fuel pellets that shrink when baked, and in that the third receptacle (25) is smaller than the first receptacle (15).

10. Device for transferring objects according to claim 1, wherein a central portion of the tray is convex along a direction joining the slits.

11. Process for transferring objects according to claim 7, wherein a central portion of the tray is convex along a direction joining the slits.

12. Device for transferring objects according to claim 1, wherein the means for holding the receptacles holds the receptacles with the open tops facing the convex cover.

13. Process for transferring objects according to claim 7, wherein the means for holding the receptacles holds the receptacles with the open tops facing the convex cover.

* * * * *